United States Patent Office 3,494,918
Patented Feb. 10, 1970

3,494,918
2-CARBONYL-PREGNATRIENES AND A METHOD
FOR THEIR PREPARATION
Pietro De Ruggieri, Carmelo Gandolfi, and Umberto
Guzzi, Milan, Italy, assignors to Ormonoterapia Richter
S.p.A., Milan, Italy, a corporation of Italy
No Drawing. Filed Aug. 22, 1966, Ser. No. 573,853
Claims priority, application Italy, Aug. 23, 1965,
18,855/65
Int. Cl. C07c *173/00, 119/00*
U.S. Cl. 260—239.55   15 Claims

ABSTRACT OF THE DISCLOSURE

Compounds of the formula

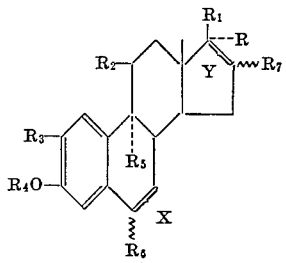

wherein R is H, OH, 2'-tetrahydropyranyloxy or acyloxy; $R_1$ is —$COCH_3$, —$COCH_2OH$,

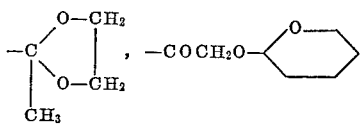

or —$COCH_2O$ acyl; R and $R_1$ together may be 17,20:20,21-bismethylene-dioxy; $R_2$ is H, =O, α=OH or β=OH; $R_3$ is —CHO, —CH=NOH, —CN, —$CH_2NH_2$, —CH=$NR_a$ wherein $R_a$ is alkyl, aryl or aralkyl, —$COOR_b$ wherein $R_b$ is H, lower alkyl, —$CONH_2$, —$CONHNHC_6H_5$, —$CONHNH_2$, —$CON_3$ or —$CON(R_a)_2$; $R_4$ is H, 2'-tetrahydropyranyl, alkyl, $C_6H_5CH_2$— or acyl; $R_5$ is H, F, Cl or Br; $R_6$ is H, —$CH_3$, Cl or F; $R_7$ is H, Cl, Br, OH or —$CH_3$; and X and Y are each a single or a double bond.

The compounds are useful as cortical, hypocholesterolemic and hypophysis-blocking drugs.

The present invention relates to the compounds of the formula:

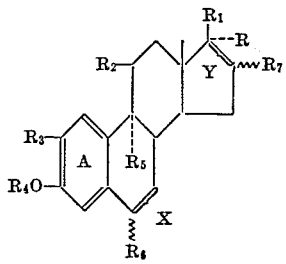

wherein:
the steroidal ring A is an aromatic ring which, being mesomeric, is indifferently 1,3,5(10) and 2,4,10(1)-triene;
R is hydrogen, hydroxy, 2'-tetrahydropyranyloxy, or acyloxy where the acyl radical is derived from a saturated or unsaturated carboxylic acid having 2 to 10 C atoms;
$R_1$ is —$COCH_3$, —$COCH_2OH$,

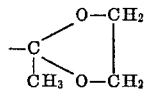

or —$COCH_2O$=acyl where the acyl radical is derived from at saturated or unsaturated aliphatic monocarboxylic acid having 2 to 10 C atoms or from succinic, phenylacetic, phenylpropionic, phenylpropiolic, (cis and trans) cinnamic, benzoic or salicylic acid;
R and $R_1$ together are 17,20:20,21-bismethylenedioxy;
$R_2$ is hydrogen, keto, α-hydroxy or β-hydroxy;
$R_3$ is formyl, —CH=NOH, cyano, $CH_2NH_2$, —CH=$NR_a$ where $R_a$ is lower alkyl, aryl or aralkyl, —$COOR_b$ where $R_b$ is H or lower alkyl, —$CONH_2$, —$CONHNHC_6H_5$, —$CONHNH_2$, —$CON_3$, or $CON(R_a)_2$ where $R_a$ has the meaning given above;
$R_4$ is hydrogen, 2'-tetrahydropyranyl, lower alkyl, $C_6H_5$—$CH_2$—, or an acyl radical derived from a saturated or unsaturated aliphatic monocarboxylic acid having 2 to 10 C atoms or from phenylacetic, phenylpropionic, phenylpropiolic, (cis and trans) cinnamic, benzoic or salicylic acid; $R_5$ is hydrogen, fluorine, chlorine or bromine atom;
$R_6$ is hydrogen, methyl, Cl, or F;
$R_7$ is a hydrogen, chlorine, or bromine atom, hydroxy, or methyl; and
X and Y are each a single or a double bond.

In the annexed claims, the 1,3,5(10)-triene structure is recited, but it will be understood that they cover the 2,4,10(1)-triene structure as well.

The compounds of the present invention are useful as cortical, hypocholesterolemic and hypophysis-blocking drugs, and are prepared starting from compounds of the following formula:

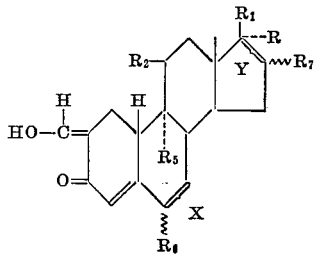

wherein R and $R_1$, singly and together, $R_2$, $R_5$, $R_6$, $R_7$, X and Y have the meanings given above.

These compounds, which are 2-hydroxymethylene-3-keto-$\Delta^4$-19-nor-pregnanes, when reacted in solvents selected from the group consisting of benzene acetone, and dioxane with dehydrogenating agents such as dichlorodicyano-benzoquinone (DDQ) and chloranil undergo dehydrogenation and aromatization of the steroidal ring A to give a compound of the formula

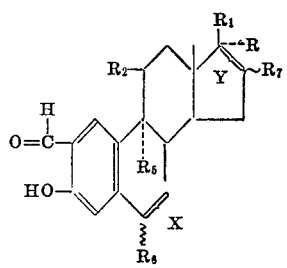

wherein the steroidal ring A is an aromatic ring which, being mesomeric, is indifferently 1,3,5(10) and 2,4,10(1)- triene and R and $R_1$ singly and together, $R_2$, $R_5$, $R_6$, $R_7$, X and Y have the meanings given above.

The 2-formyl-19-nor-pregna-1,3,5(10)-triene-3-ols react with acid chlorides and anhydrides to give the corresponding 3-acyloxy derivatives.

By reacting the same o-hydroxy-aldehydes with an alkyl or aralkyl halide or sulfate ($CH_3I$, $(C_2H_5)_2SO_4$, $C_6H_5CH_2Cl$) in alcoholic or aqueous alcoholic solutions, or in benzene or toluene in the presence of $Ag_2CO_3$ or a base, such as $K_2CO_3$, KOH or NaOH, the corresponding 3-ethers are obtained.

By oxidation of a 2-formyl-3-(hydroxy, tetrahydropyranyloxy, lower alkoxy, benzyloxy or acyloxy)-19-nor-pregna-1,3,5(10)-triene with chromosulfuric mixture, pyridine and $CrO_3$, $KMnO_4$ in acetic acid, or with ammoniacal silver nitrate, the corresponding 2-carboxyl compound is prepared.

The 2-carboxyl compounds may readily be converted to corresponding compounds having at the 2-position a group —$COOR_d$ wherein $R_d$ is lower alkyl, benzyl or phenyl or a group —$CON(R_f)_2$ wherein $R_f$ is H, lower alkyl, phenyl, $C_6H_5NH$—, —$NH_2$ or benzyl. In forming these two types of compounds, there is employed a common step, the production of the 2-carbonyl chloride by reaction of a 2-carboxyl compound or its sodium or potassium salt with thionyl chloride or oxalyl chloride in ethyl ether or benzene as a solvent.

To produce compounds having a —$COOR_d$ group at the 2-position, the intermediate 2-carbonyl chloride is reacted with a dry compound $R_dOH$. Examples of dry lower alkanols which may be employed are methanol, ethanol, n-propanol, isopropanol and n-butanol.

To produce compounds having a group —$CON(R_f)_2$ at the 2-position, the intermediate 2-carbonyl chloride is reacted with the appropriate compound $HN(R_f)_2$. Examples of lower alkyl amines which may be employed as reactants are methylamine, ethylamine, diethylamine, n-propylamine, isopropylamine and n-butyl amine.

The following equations illustrate a series of reactions now to be described:

2-hydroxymethylene-19-nor-pregna-4-en-3-ones (I) are reacted with hydroxylamine hydrochloride to give the [2,3-d]-isoxazoles (II) from which, by reaction in dioxane with sodium alcoholates, the corresponding 2α-cyano-19-nor-pregna-4-en-3-ones (III) are obtained.

These compounds, by reaction either with aliphatic diazo derivatives or with alkyl halides in aqueous alcoholic solutions in the presence of bases, or with alcohols in benzene and toluene in the presence of Lewis acids, lead to steroidal 2-cyano-3-alkoxy-19-nor-pregna-2,4-dienes (IV).

The reaction at room temperature, in dioxane, acetone, or benzene, of 19-nor-pregna-4-en-[2,3-d]-isoxazoles (II) with the stoichiometric amount of chloranil or 2,3-dicyano-5,6-dichloro-benzoquinone (DDQ) yields 19-nor-pregna-1,3,5(10)-triene - [2,3-d] - isoxazoles (V). These compounds (V), by boiling in dioxane or by treating their solutions with dilute alkalies are transformed into 2-cyano-19-nor-pregna-1,3,5(10)-triene-3-ols (VI).

The steroidal o-cyano-phenols (VI) may also be obtained from 19-nor-pregna-4-en-[2,3-d]-isoxazoles (II) by refluxing the latter in dioxane with hydrogen acceptors, such as stilbene, styrene, and methyl and ethyl esters of fumaric, maleic, and cinnamic acids, in the presence of Pd/C as a hydrogen transfer agent. They may also be prepared from steroidal 2α-cyano-3-keto-$\Delta^4$-19-nor-pregnenes (III) by reaction with cloranil or DDQ in dioxane in the presence of a tertiaryamine, such as trimethyl- or tributylamine or by refluxing in dioxane, benzene, or xylene, with hydrogen acceptors, such as stilbene, ethyl maleate, etc. in the presence of Pd/C as a hydrogen transfer agent.

Steroidal o-cyano-phenols (VI) react with alkyl and aralkyl halides and sulfates in alcoholic or aqueous alcoholic solutions, or in benzene or toluene in the presence of $Ag_2CO_3$ or of bases, such as $K_2CO_3$, KOH, or NaOH to give steroidal 2-cyano-3-alkoxy- and 2-cyano-3-aralkoxy-19-nor-pregna-1,3,5(10)-trienes (VII), which, on the other hand, may be obtained starting from steroidal 2-cyano-3- alkoxy- and -aralkoxy-19-nor-pregna-2,4-dienes (IV) by dehydrogenation and aromatization with chloranil or DDQ in dioxane, benzene or acetone.

Similarly, a compound VII may be obtained from a compound IV by refluxing in dioxane with a hydrogen acceptor, such as ethyl maleate, methyl maleate, ethyl fumarate, ethyl cinnamate or styrene in the presence of Pd/C as a hydrogen transfer agent.

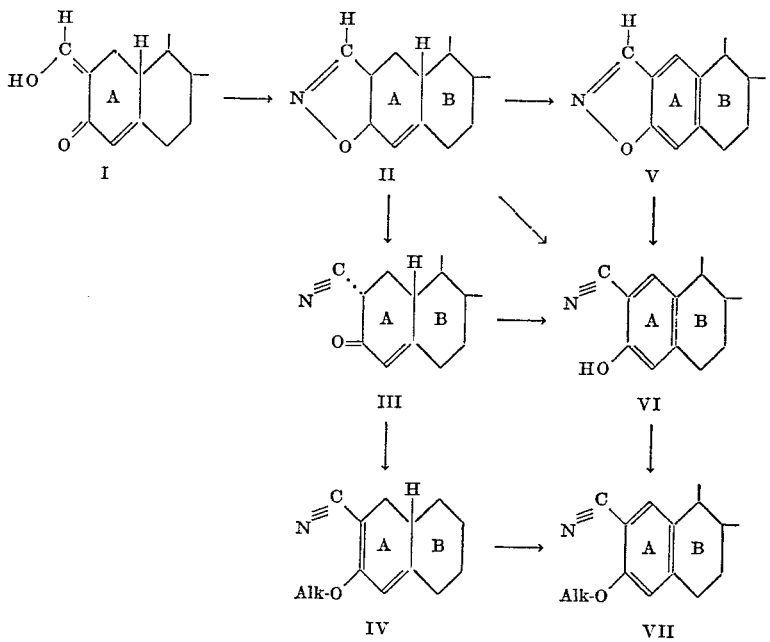

2 - formyl - 3 - hydroxy - 19 - nor - pregna - 1,3,5(10)-trienes and their ethers (VIII), by reduction with $LiAlH_4$ and with $NaBH_4$ yield the corresponding 2-hydroxymethyl derivatives (IX) according to the following equation:

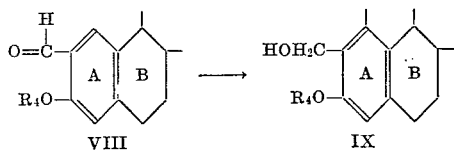

In the equation R₄ is H, tetrahydropyranyl, lower alkyl or benzyl. When LiAlH₄ is employed, the solvent may be tetrahydrofurane or ethyl ether, and when NaBH₄ is employed, the solvent may be methanol, ethanol, dioxane, water or mixtures thereof.

The same steroidal 2-formyl-19-nor-pregna-1,3,5(10)-triene-3-ols and their 3-enol-ethers (VIII) react with primary amines to give the 2-formylidene derivatives (X), which undergo reduction with LiAlH₄ and with NaBH₄ to the corresponding 2-N-substituted methylamino-pregnatrienes (XI) in accordance with the following equation:

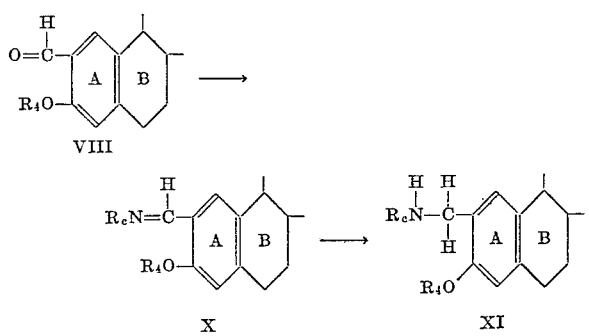

In the equations R₄ is H, tetrahydropyranyl, lower alkyl or benzyl and R_c is lower alkyl, aryl, aralkyl, cyclohexyl or cyclopentyl. Examples of primary amines which may be employed are primary aliphatic amines of 2 to 7 carbon atoms, benzylamine, C₆H₅(CH₂)₂NH₂, C₆H₅(CH₂)₃NH₂, C₆H₅CH₂CH(CH₃)NH₂, aniline, cyclopentylamine and cyclohexylamine. The reaction with the primary amine may be carried out in methanol, ethanol, benzene or toluene as solvent. When the reduction is carried out using sodium borohydride, the solvent may be dioxane, methanol, water or mixtures thereof and when carried out with lithium aluminum hydride, the solvent may be ethyl ether, benzene or tetrahydrofurane.

From steroidal 2-cyano-19-nor-pregna-1,3,5(10)-triene-3-ols and their ethers (XII) by reduction with Raney Ni in formic acid, the corresponding 2-formyl steroids (XIII) are obtained, while reduction with LiAlH₄ in tetrahydrofurane leads to 2-methylamino-19-nor-pregna-1,3,5(10)-trienes (XIV) as set forth in the following equations:

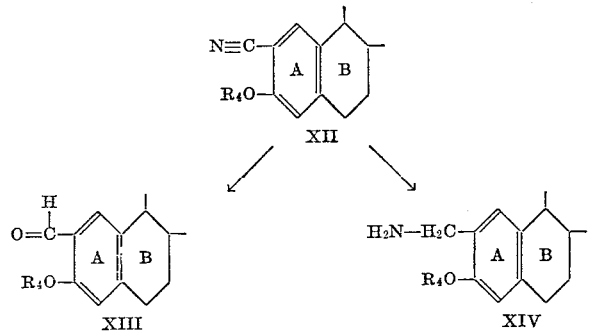

The following examples serves to illustrate the invention but are not intended to limit it in any way:

EXAMPLE 1

2 - formyl - 3 - methoxy - 19 - nor - pregna - 1,3,5(10)-triene - 20 - one - 17α - (2' - tetrahydropyranyloxy)

12 parts of 20,20-ethylenedioxy-19-nor-pregna-4-en-17α-ol-3-one are dissolved in 300 parts of dry benzene and, operating in a nitrogen current, there are added 9 parts of sodium methylate and 25 parts of ethyl formate. After 12 hours, the resulting solution is diluted with hexane, the separated solid is filtered out, dried under vacuum, and dissolved in water. The solution is acidified with a saturated monosodium phosphate solution, extracted with methylene chloride and the organic extracts are evaporated to dryness and crystallized from acetone to give 9.2 parts of 2-hydroxymethylene-20,20-ethylendioxy - 19 - nor - pregna - 4 - en - 17α - ol - 3 - one; λ_max 252 mμ (ε=12,000). To a solution of 3.88 parts of the latter compound in 25 parts of dioxane there is added a solution of 2.5 parts of 2,3-dicyano-5,6-dichlorobenzoquinone (DDQ) in 25 parts of dioxane. A rapid formation of a precipitate (reduced DDQ) occurs, and, after 4 minutes, it is diluated with 300 ml. CH₂Cl₂ and the solution is percolated through a column of 400 g. silica gel. The eluates are evaporated to dryness and crystallized from acetone to give 3.2 parts of 2-formyl-20,20-ethylendioxy-19 - nor - pregna - 1,3,5(10) - triene - 3,17α - diol; λ_max 226.5; 267.5 and 338 mμ (lg. ε=4.19; 4.16 and 3.54). When a solution of 0.2 part of the latter compound in 6 parts of methanol is heated on the water bath at 60° C. over a period of 15 minutes with 4 parts of 2NH₂SO₄, there are obtained from the organic phase after dilution with water and extraction with methylene chloride by evaporating the solvent and by crystallizing from methanol, 0.11 part of 2-formyl-19-nor-pregna-1,3,5(10)-triene-3,17α-diol-20-one.

3 parts of 2-formyl-20,20-ethylenedioxy-19-nor-pregna-1,3,5(10)-triene-3,17α-diol are dissolved in benzene and refluxed while stirring with 5 parts of methyl iodide and 10 parts of Ag₂CO₃. The bottoms are taken off, the organic phase is extracted with alkali, washed with water and evaporated to dryness to give 2.12 parts of 2-formyl-3 - methoxy - 20,20 - ethylenedioxy - 19 - nor - pregna - 1,3,5(10)-triene-17α-ol. This compound is deketalized as described above to give 1.15 parts of 2-formyl-3-methoxy-19-nor-pregna-1,3,5(10)-triene-17α-ol-20-one; λ_max 227, 265, 336 mμ (ε=16,600, 12,000, 4,150). To a solution of the latter in benzene, there is added at room temperature 1 part of 2,3-dihydropyrane and 0.02 part of dry p-toluene sulfonic acid. After 4 hours, the mixture is neutralized with sodium ethylate, the benzene phase is washed with water and evaporated to dryness. Crystallization from aqueous methanol gives 1.06 parts of 2-formyl-3 - methoxy - 19 - nor - pregna-1,3,5(10)-triene-20-one-17α-(2'-tetrahydropyranyloxy); λ_max 224, 266, 333.5 mμ (ε=17,000, 12,000, 4,850).

By operating as above, the following compounds are prepared:

2-formyl-3-hydroxy-19-nor-pregna-1,3,5(10)-triene-20,20-ethylenedioxide 2-formyl-3-hydroxy-19-nor-pregna-1,3,5(10),16-tetraene-20,20-ethylenedioxide 2-formyl-3-hydroxy-19-nor-pregna-1,3,5(10)-triene-20-one 2-formyl-3-hydroxy-19-nor-pregna-1,3,5(10),16-tetraene-20-one 2-formyl-3-methoxy-19-nor-pregna-1,3,5(10)-triene-20,20-ethylenedioxide 2-formyl-3-methoxy-19-nor-pregna-1,3,5(10),16-tetraene-20-one 2-formyl-3-methoxy-19-nor-pregna-1,3,5(10)-triene-20-one 2-formyl-19-nor-pregna-1,3,5(10)-triene-3,11β,17α,21-tetraol-20,20-ethylenedioxide 2-formyl-3-methoxy-19-nor-pregna-1,3,5(10)-triene-11β,17α,21-triol-20,20-ethylenedioxide 2-formyl-19-nor-pregna-1,3,5(10)-triene-3,17α,21-triol-20,20-ethylenedioxide 2-formyl-3-methoxy-19-nor-pregna-1,3,5(10)-triene-17α,21-diol-20,20-ethylenedioxide 2-formyl-19-nor-pregna-1,3,5(10)-triene-3,11β,17α,21-tetraol-20-one 2-formyl-3-methoxy-19-nor-pregna-1,3,5(10)-triene-11β, 17α,21-triol-20-one 2-formyl-19-nor-pregna-1,3,5(10)-triene-3,17α,21-triol-20-one 2-formyl-3-methoxy-19-nor-pregna-1,3,5(10)-triene-17α, 21-diol-20-one.

EXAMPLE 2

2-cyano-19-nor-pregna-1,3,5(10)-triene-3,17α-diol-20-one-17-acetate 6 parts of 2-hydroxymethylene-20,20-ethylene-dioxy-19-nor-pregna-4-en-17α-ol-20-one in 520 parts of ethanol are refluxed for 20 minutes with 110 parts of hydroxylamine hydrochloride dissolved in 6 parts of water. The mixture is concentrated under vacuum to a small volume, neutralized and diluted with water. The precipitated product (5 parts) is filtered out and recrystallized from methanol to give 4 parts of 19-nor-pregna-4-en-17α-ol-20-one-[2,3-d]-isoxazole; $\lambda_{max}$ 238 mμ ($\epsilon$=11,800). 3 parts of the latter compound are suspended in 12 parts of acetic anhydride, and to the suspension is added 0.025 part of p-toluene sulfonic acid and heated on the water bath over a period of 15 minutes up to complete dissolution. It is kept at room temperature for 2 hours, diluted with pyridine and water. The precipitated product is filtered out and crystallized from methanol to give 3.02 parts of 19-nor-pregna-4-en-17α-ol-20-one - [2,3-d] - isoxazole - 17-acetate. Two parts of the latter compound are dissolved in 50 parts of dioxane and are refluxed during 36 hours with 1.1 parts of ethyl maleate and 2.5 parts of 10% Pd/C. The catalyst is filtered off and the filtrate is evaporated to dryness. The obtained tarry mass is leached with petroleum ether and the residue is crystallized from methanol to give 1.57 parts of 2-cyano-19-nor-pregna-1,3,5(10)-triene-3,17α-diol-20-one-17-acetate.

In an analogous manner the following compounds were prepared:

2-cyano-19-nor-pregna-1,3,5(10)-triene-3-ol-20-one
2-cyano-19-nor-pregna-1,3,5(10)-triene-3,21-diol-20-one
2-cyano-19-nor-pregna-1,3,5(10)-triene-3,17α,21-triol-20-one
2-cyano-19-nor-pregna-1,3,5(10)-triene-3,11β,17α,21-tetraol-20-one
2-cyano-19-nor-pregna-1,3,5(10)-16-tetraene-20-one-3-ol
2-cyano-19-nor-pregna-1,3,5(10)-16-tetraene-20,20-ethylenedioxy-3-ol.

EXAMPLE 3

2-cyano-3-methoxy-6α,16β-dimethyl-17α,20:20,21-bismethylenedioxy-19-nor-pregna-1,3,5(10)-triene 25 parts of 6α,16β - dimethyl - 19 - nor-pregna-4-en-17α,21 - diol-3,20-dione dissolved in chloroform are reacted with an aqueous solution of formaldehyde in the presence of concentrated hydrogen chloride to give 18 parts of 6α,16β - dimethyl - 19 - nor-pregna-4-en-3-one-17α,20:20,21-bismethylenedioxy. The successive reaction of this compound (17 parts) in benzene with ethyl formate and sodium methylate yields, as described in Example 1, 2 - hydroxymethylene - 6α,16β - dimethyl-17α, 20:20,21 - bismethylenedioxy - 19 - nor-pregna-4-en-3-one (12.85 parts). From the latter compound (11.5 parts), as described in Example 2, by reaction with hydroxylamine hydrochloride, there are obtained 10.7 parts of 6α,16β - dimethyl - 17α,20:20,21 - bismethylenedioxy-19 - nor - pregna - 4-en-[2,3-d]-isoxazole; $\lambda_{max}$ 283 mμ ($\epsilon$=10,800).

6 parts of this [2,3-d]-isoxazole are dissolved in 30 parts of dry, peroxide-free dioxane and, while cooling the solution externally, there is added dropwise a solution of 1 part sodium methylate in 10 parts of methanol. An abundant precipitate forms, which, after dilution with ethyl ether, is filtered and suspended in water. After acidification and extraction with ethyl acetate, by evaporation of the organic phase, there is obtained a crystalline residue of 2α - cyano - 6α,16β - dimethyl-17α,20:20,21-bismethylene dioxy - 19 - nor-pregna-4-en-3-one (4.2 parts); $\lambda_{max}$ 240 mμ, $\epsilon$=14,850.

A suspension of this compound in methanol (2 parts) is treated with an excess of a diazomethane ethereal solution, until the product is completely dissolved. The solvent is evaporated and there crystallizes 2-cyano-3-methoxy - 6α,16β - dimethyl - 17α,20:20,21-bismethylenedioxy-19-nor-pregna-2,4-diene.

0.440 part of the latter compound are dissolved in 15 parts of dioxane; to this solution there is added a solution of 0.255 part DDQ in 5 parts dioxane. An abundant precipitate of 2,3 - dicyano - 5,6 - dichloro-1,4-hydroquinone forms, and it is filtered off. The filtrate is evaporated to dryness, the residue is dissolved in methylene chloride and the organic phase is thoroughly washed with alkali and water, then evaporated to dryness, and subsequent crystallization from acetone gives 0.28 part of 2 - cyano - 3 - methoxy-6α,16β-dimethyl-17α,20:20, 21 - bismethylenedioxy - 19-nor-pregna-1,3,5(10)-triene. The same compound (1.65 parts) can be obtained by starting from 2.8 parts of 2 - cyano - 3 - methoxy-6α,16β-dimethyl-17α,20:20,21 - bismethylenedioxy - 19 - nor-pregna-2,4-diene which are dissolved in 75 parts of dioxane and refluxed with 2.8 parts of 10% Pd/C and 2.5 parts of styrene for 35 hours. The catalyst is filtered off, the filtrate is evaporated to dryness and crystallization from acetone gives the above described 2-cyano-3-methoxy - 19 - nor - pregna-1,3,5(10)-triene.

EXAMPLE 4

2-cyano-6α,16β-dimethyl-17α,20:20,21-bismethylenedioxy-19-nor-pregna-1,3,5(10)-triene-3-ol 0.85 part of 2α - cyano - 6α,16β - dimethyl-17α,20:20, 21 - bismethylenedioxy - 19 - nor-pregna-4-en-3-one (see Example 3) is dissolved in 18 parts of dioxane and 0.15 part of n-tributylamine are added and the resulting mixture is dehydrogenated with 0.5 part DDQ dissolved in 12 parts dioxane. The precipitate which forms is filtered off, the filtrate is diluted with methylene chloride and percolated through a silica gel column. By evaporation of the methylene chloride-dioxane fractions and crystallization from methanol, there are obtained 0.68 part of 2-cyano-6α, 16β-dimethyl - 17α,20:20,21 - bismethylenedioxy - 19-nor-pregna-1,3,5(10)-triene-3-ol.

EXAMPLE 5

2-cyano-19-nor-pregna-1,3,5(10)-triene-3,11β,17α, 21-tetraol-20-one-21-acetate

To a solution of 2 parts of 19 - nor - pregna - 4-en-11β,17α,21-triol-20-one[2,3-d]-isoxazole - 21 - acetate in 20 parts of dioxane, there is added a solution of 1.2 parts DDQ in 15 parts dioxane. The hydroquinone precipitate is filtered off after dilution with methylene chloride and the filtrate is percolated through a silica gel column. There are obtained 1.57 parts of 19 - nor - pregna-1,3,5 (10) - triene - 11β,17α,21-triol-20-one-[2,3-d]-isoxazole-21 - acetate; $\lambda_{max}$ 246, 253, 238 mμ ,1g $\epsilon$=3.74, 3.72, 4.00). This product is refluxed in 13 parts of dioxane, and by evaporating the solvent and crystallizing from methanol, there are obtained 1.36 parts of 2-cyano-19-nor-pregna-1,3,5(10) - triene - 3,11β,17α,21 - tetraol-20-one-21-acetate.

EXAMPLE 6

2-formyl-3-ethoxy-6α,16β-dimethyl-17α,20:20,21-bismethylenedioxy-19-nor-pregna-1,3,5(10)-triene 2.5 parts of 2-hydroxymethylene-6α,16β - dimethyl-17α,20:20,21-bismethylenedioxy-19-nor-pregna - 4-ene-3-one are dehydrogenated with DDQ (1.4 parts) to 2-formyl-6α,16β-dimethyl - 17α,20:20,21-bismethylenedioxy-19-nor-pregna-1,3,5(10)-triene-3-ol (1.97 parts) by operating as in Example 1. 1.3 parts of this compound are dissolved in 20 parts of methanol and to the solution there is added 1.4 parts of KOH dissolved in 17 parts of water. While maintaining the temperature between 30 and 35° C., there are added, over a period of 40 minutes, 6.4 parts of KOH dissolved in 16.8 parts of water and 10 parts of diethyl sulfate. It is left for 1 hour at 34–36° C., diluted with water, filtered and washed with water to neutrality. By crystallizing from acetone there are obtained 0.34 part of 2-formyl-3-ethoxy-6α,16β-dimethyl-17α,20:20,21-bismethylenedioxy-19-nor-pregna-1,3,5(10)-triene.

EXAMPLE 7

2-cyano-3-ethoxy-6α,16β-dimethyl-19-nor-pregna-1,3,5(10)-triene-17α,21-diol-20-one From 1.35 parts of 2 - cyano - 6α,16β - dimethyl-17α,20:20,21-bismethylenedioxy-19-nor-pregna-1,3,5(10)-triene-3-ol, by reaction with ethyl sulfate in hydroalcoholic solution, as described in the above example, there are obtained 0.42 part of 2-cyano13-ethoxy-6α,16β-dimethyl - 17α,20:20,21 - bismethylenedioxy-19-nor-pregna-1,3,5(10)-triene, which is dissolved in 25 parts of formic acid (80% aqueous solution) and left for 1 hour at 75° C. The solution is evaporated to dryness, added several times with toluene, and evaporated again to dryness. The residue is dissolved in dry methanol and, while in a current of nitrogen, it is treated with a 0.8 N solution of sodium methylate. After 10 minutes at 25° C. the solution is neutralized, concentrated and thoroughly diluted with water. It is extracted with ethyl acetate and the organic phases, after concentration, are percolated on silicate gel. There are obtained 0.18 part of 2-cyano-3-ethoxy-6α,16β-dimethyl - 19 - nor - pregna-1,3,5(10)-triene-17α,21-diol-20-one.

By operating as in Examples 2 and 7 the following compounds were prepared:

19-nor-pregna-1,3,5(10)-triene-20-one-[2,3-d]-isoxazole
19-nor-pregna-1,3,5(10)-triene-17α-ol-20-one-[2,3-d]-isoxazole
19-nor-pregna-1,3,5(10)-triene-17α-ol-20-one-[2,3-d]-isoxazole-17-acetate
19-nor-pregna-1,3,5(10)-triene-17α-ol-one-[2,3-d]-isoxazole-17-capronate
2-cyano-3-methoxy-19-nor-pregna-1,3,5(10)-triene-11β,17α,21-triol-20-one
2-cyano-3-ethoxy-19-nor-pregna-1,3,5(10)-triene-11β,17α,21-triol-20-one
2-cyano-3-n-butoxy-19-nor-pregna-1,3,5(10)-triene-11β,17α,21-triol-20-one
2-cyano-3-benzylether-19-nor-pregna-1,3,5(10)-triene-11β,17α,21-triol-20-one
2-cyano-3-benzylether-19-nor-pregna-1,3,5(10)-triene-11β,17α,21-triol-20-one-17α,21-diacetate
2-formyl-3-methoxy-19-nor-pregna-1,3,5(10-triene-11β,17α,21-triol-20-one-17α,21-diacetate
2-formyl-3-ethoxy-19-nor-pregna-1,3,5(10)-triene-11β,17α,21-triol-20-one-17α,21-diacetate
2-formyl-3-benzylether-19-nor-pregna-1,3,5(10)-triene-11β,17α,21-triol-20-one-17α,21-diacetate
2-formyl-3-ethoxy-6α,16β-dimethyl-19-nor-pregna-1,3,5(10)-triene-17α21-diol-20-one
2-formyl-3-benzylether-6α,16β-dimethyl-19-nor-pregna-1,3,5(10)-triene-17α,21-diol-20-one
2-formyl-3-benzylether-6α,16β-dimethyl-19-nor-pregna-1,3,5(10)-triene-17α,21-diol-20-one-17,21-diacetate
2-formyl-3-benzylether-19-nor-pregna-1,3,5(10)-triene-20,20-ethylenedioxide.

EXAMPLE 8

2-cyano-3-(2'-tetrahydropyranyloxy)-6α,16β-dimethyl-19-nor-pregna-1,3,5(10)-triene-17α,21-diol - 20-one-17,21-diacetate 2 parts of 2 - cyano-6α,16β-dimethyl - 19-nor-pregna-1,3,5(10) - triene - 3,17α,21 - triol-20-one-3-benzylether-17,21-diacetate are dissolved in 80 parts of dioxane and added to a suspension of 4 parts of 5% Pd/CaCO₃, prehydrogenating in 50 parts of dioxane. It is hydrogenated at atmospheric pressure at 25° C. up to the absorption of the equivalent of one mole of H₂. The catalyst is filtered off and the filtrate is well washed with dioxane. It is evaporated to dryness and the crystallized product (1.32 parts) is dissolved in 100 parts of benzene to which are added 0.45 part of 2,3-dihydropyrane and 0.05 part of dry p-toluene sulfonic acid. After 3 hours, the reaction mixture is neutralized with sodium methylate, the solution is thoroughly washed with alkali, then with water and evaporated to dryness to give 1.15 parts of 2-cyano-3-(2'-tetrahydropyranyloxy) - 6α,16β-dimethyl-19-nor-pregna-1,3,5(10)-triene-17α,21-diol-20-one-17,21-diacetate.

EXAMPLE 9

6α,16β-dimethyl-17α,20:20,21 - bismethylenedioxy-19-nor-pregna-1,3,5(10)-triene-3-ol-2-carboxy 3-benzylether A solution of 2 parts of 2-formyl-6α,16β-dimethyl-17α,20:20,21 - bismethylenedioxy - 19-nor-pregna - 1,3,5 (10)-triene-3-ol in 50 parts of ethanol is refluxed for 12 hours with 3.8 parts of benzyl chloride (C₆H₅CH₂Cl) in the presence of 5 parts of finely divided potassium carbonate. The inorganic salts are filtered out, the filtrate is concentrated to a small volume, diluted with 250 parts of benzene and thoroughly extracted with alkali. The organic phase, after washing with water to neutrality, drying over Na₂SO₄, is evaporated to effect the crystallization of 1.86 parts of 2-formyl-6α,16β-dimethyl-17α,20:20,21-bismethylenedioxy-19-nor-pregna-1,3,5(10) - triene-3-ol-3-benzylether. To a solution of 0.95 part of the latter compound in 60 parts of acetone are added 5 parts of an 8 N chromic acid solution in water and sulfuric acid and the resulting mixture is left for 40 minutes at 25–30° C. The excess of oxidizing agent is destroyed with isopropylic acid, the solution is concentrated and then diluted with water. By filtration and crystallization from ethyl acetate there are obtained 0.46 part of 6α,16β-dimethyl-17α,20:20,21 - bismethylenedioxy - 19 - nor-pregna-1,3,5 (10)-triene-3-ol-2-carboxy 3-benzylether.

EXAMPLE 10

2-hydroxymethyl-3-(2'-tetrahydropyranyloxy)-19-nor-pregna-1,3,5(10)-triene-20-one To a solution of 2.15 parts of 2-formyl-19-nor-pregna-1,3,5(10) - triene-3-ol-20 - one - 20,20-ethylenedioxy-3-benzylether in 25 parts of tetrahydrofurane is added 2 parts of LiAlH₄ and the mixture is maintained for 1 hour under stirring. The reagent excess is destroyed with ethyl acetate, Na₂SO₄-saturated water, dry Na₂SO₄ is added and filtered. The solution is evaporated to dryness. The resulting crude 2-hydroxymethyl-19-nor-pregna-1,3,5(10)-triene-3-benzylether-20 - one - 20,20 - ethylenedioxide is dissolved in 40 parts of methanol and 30 parts of 2 N H₂SO₄. After 15 minutes at 60° C., the solution is concentrated, diluted with water and filtered to give 2-hydroxymethyl-19 - nor - pregna - 1,3,5(10) - triene-20-one-3-ol-3-benzylether (1.05 parts) which is acetylated with 4 parts of pyridine and 2 parts of acetic anhydride overnight at room temperature. Then the reaction mixture is diluted with water, filtered and the precipitate is recrystallized from methanol to give 1.03 parts of 2-acetoxy-methyl-19-nor-pregna-1,3,5(10)-triene-3-ol-20-3-benzylether.

From 0.5 part of the latter compound, by hydrogenating with Pd/C₄CO₃ as described in Example 8, there are obtained, after crystallization 0.39 part of 2-acetoxy-methyl-19-nor-pregna-1,3,5(10)-triene-3-ol-20-one which are reacted in dry benzene with 0.2 part of 2,3-dihydropyrane and 0.01 part of p-toluene sulfonic acid. After neutralization, washing with water to neutrality, solvent evaporation, and crystallization from ethyl ether-hexane, there are obtained 0.38 part of 2-acetoxymethyl-3-(2'-tetrahydropyranyloxy)-19-nor-pregna-1,3,5(10)-triene-20-one.

The latter compound is treated in dry methanol with a 1.25 N sodium methylate solution for 2 hours at room temperature. Then the reaction mixture is neutralized with monosodium phosphate and upon dilution with water, there are separated 0.25 part of 2-hydroxymethyl-3-(2'-tetrahydropyranyloxy)-19-nor-pregna-1,3,5(10)-triene-20-one.

EXAMPLE 11

2-amino-methyl-3-methoxy-19-nor-pregna-1,3,5(10)-triene-11β,17α,21-triol-20-one 2.4 parts of 2-cyano-3-methoxy-17α,20:20,21-bismethylenedioxy-19-nor-pregna-1,3,5(10)-triene-11β-ol in 25 parts of tetrahydrofurane are maintained for 1½ hours under reflux with a suspension of 3 parts of $LiAlH_4$ in 10 parts of tetrahydrofurane. The reagent excess is destroyed with ethyl acetate and with a sodium sulfate saturated solution, the salts are filtered out, and the solution is evaporated to dryness. Residual (crude) 2-amino-methyl-3-methoxy-17α,20:20,21-bismethylenedioxy-19-nor-pregna-1,3,5(10)-triene-11β-ol is treated in methanol with a stoichiometric amount of benzaldehyde. From the solution, there is crystallized 2-(N-benzylidene)-aminomethyl-3-methoxy-17α,20:20,21-bismethylenedioxy-19-nor-pregna-1,3,5(10)-triene-11β-ol, which by reduction with $NaBH_4$ gives 1.8 parts of 2-(N-benzyl)-aminomethyl-3-methoxy-17α,20:20,21-bismethylenedioxy-19-nor-pregna-1,3,5(10)-triene-11β-ol. A solution of this compound in 80% of formic acid is maintained at 70° C. for 1 hour, and after evaporation of the resulting solution and treatment with a sodium methylate solution, there are obtained 0.72 part of 2 N-benzylaminomethyl-3-methoxy-19-nor-pregna-1,3,5(10)-triene-11β,17α-21-triol-20-one. By hydrogenating 0.5 part of the latter compound in ethyl acetate with 0.8 part of 5% $Pd/CaCO_3$ up to the absorption of the equivalent of 1 mole of hydrogen, there are obtained 0.22 part of 2-aminomethyl-3-methoxy-19-nor-pregna-1,3,5(10)-triene-11β,17α,21-triol-20-one.

EXAMPLE 12

2-aminomethyl-19-nor-pregna-1,3,5(10),16-tetraene-3-ol-20-one 1.5 parts of 2-cyano-19-nor-pregna-1,3,5(10),16-tetraene-20-one-3-ol-20,20-ethylenedioxide are treated with 2 parts of $LiAlH_4$ in 50 parts of tetrahydrofurane, under reflux. After 6 hours the $LiAlH_4$ excess is decomposed, the inorganic salts are filtered off, and the filtrate is evaporated to dryness. The residue is dissolved in methanol and treated with 2 N sulfuric acid (10 parts) for 15 minutes at 60° C. The solution is decolorized with charcoal, filtered and carefully neutralized with a $NaHCO_3$ solution. The precipitated product is filtered out and crystallized from ethyl ether to give 0.82 part of 2-aminomethyl-19-nor-pregna-1,3,5(10),16-tetraene-3-ol-20-one.

We claim:
1. A compound of the formula

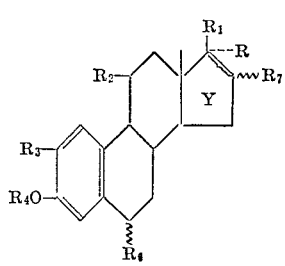

wherein R is singly a member selected from the group consisting of H, OH, 2'-tetrahydropyranyloxy and acyloxy in which the acyl radical is derived from a carboxylic acid of from 2 to 10 carbon atoms; $R_1$ is singly a member selected from the group consisting of

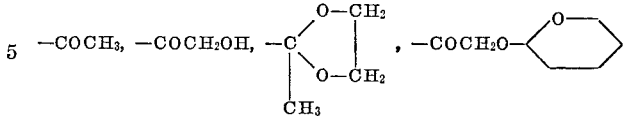

and —$COCH_2O$—acyl in which acyl is an acyl radical derived from an acid selected from the group consisting of an aliphatic monocarboxylic acid of 2 to 10 carbon atoms, succinic acid, phenylacetic acid, phenylpropionic acid, phenylpropiolic acid, cis-cinnamic acid, trans-cinnamic acid, benzoic acid and salicylic acid; R and $R_1$ together are 17,20:20,21-bismethylenedioxy; $R_2$ is a member selected from the group consisting of H and β-hydroxy; $R_3$ is a member selected from the group consisting of formyl, cyano, —$CH_2NH_2$, —CH=$NR_a$ where $R_a$ is a member selected from the group consisting of lower alkyl, aryl and aralkyl, —$COOR_b$ where $R_b$ is a member selected from the group consisting of H and lower alkyl, —$CONH_2$,

—$CONHNH_2$, —$CON_3$ and —$CON(R_a)_2$ where $R_a$ is a member selected from the group consisting of lower alkyl, aryl and aralkyl; $R_4$ is a member selected from the group consisting of H, 2'-tetrahydropyranyl, lower alkyl and benzyl; $R_6$ is a member selected from the group consisting of H and methyl; $R_7$ is a member selected from the group consisting of H and methyl; and Y is a member selected from the group consisting of a single and a double bond.

2. A compound of the formula

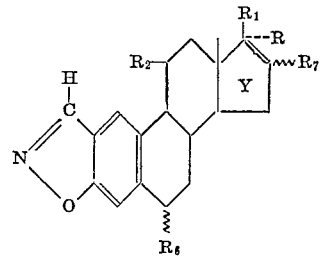

wherein R is singly a member selected from the group consisting of H, OH, 2'-tetrahydropyranyloxy and acyloxy in which the acyl radical is derived from a carboxylic acid of from 2 to 10 carbon atoms; $R_1$ is singly a member selected from the group consisting of —$COCH_3$,

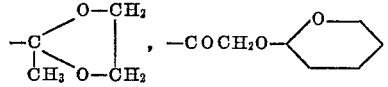

and —$COCH_2O$—acyl in which acyl is an acyl radical derived from an acid selected from the group consisting of an aliphatic monocarboxylic acid of 2 to 10 carbon atoms, succinic acid, phenylacetic acid, phenylpropionic acid, phenylpropiolic acid, cis-cinnamic acid, trans-cinnamic acid, benzoic acid and salicylic acid; R and $R_1$ together are 17,20:20,21-bismethylene-dioxy; $R_2$ is a member selected from the group consisting of H and β-hydroxy; $R_6$ is a member selected from the group consisting of H and methyl; $R_7$ is a member selected from the group consisting of H and methyl; and Y is a member selected from the group consisting of a single and a double bond.

3. A method of preparing a 2-formyl-3-hydroxy-19-nor-pregna-1,3,5(10)-triene, comprising reacting a member selected from the group consisting of a 2-hydroxymethylene-3-keto-19-nor-pregna-4-ene and its tautomer with a dehydrogenating agent selected from the group consisting of chloranil and 2,3-dicyano-5,6-dichlorobenzoquinone in 4. A method of preparing a 2-cyano-3-hydroxy-19-nor-pregna-1,3,5(10)-triene, comprising reacting a 19-nor-pregna-4-en-[3,2-d]-isoxazole with a hydrogen acceptor selected from the group consisting of methyl fumarate, ethyl fumarate, methyl maleate, ethyl maleate, methyl cinnamate, ethyl cinnamate, stilbene and styrene in dioxane in the presence of Pd/C as a hydrogen transfer agent.

5. A method of preparing a 2-cyano-3-hydroxy-19-nor-pregna-1,3,5(10)-triene, comprising reacting a 2α-cyano-3-keto-19-nor-pregna-4-ene with a hydrogen acceptor selected from the group consisting of methyl maleate, ethyl maleate, methyl cinnamate, ethyl cinnamate, stilbene and styrene in a solvent selected from the group consisting of dioxane, benzene and xylene in the presence of Pd/C as a hydrogen transfer agent.

6. A method of preparing a 2-cyano-3-hydroxy-19-nor-pregna-1,3,5(10)-triene, comprising reacting a 2α-cyano-3-keto-19-nor-pregna-4-ene with a dehydrogenating agent selected from the group consisting of chloranil and 2,3-dicyano-5,6-dichlorobenzoquinone in dioxane in the presence of a tertiary amine selected from the group consisting of trimethyl- and tributylamine.

7. A method of preparing a 2-cyano-3-alkoxy-19-nor-pregna-1,3,5(10)-triene, comprising reacting a 2-cyano-3-alkoxy-19-nor-pregna-2,4-diene with a dehydrogenating agent selected from the group consisting of chloranil and 2,3-dicyano-5,6-dichlorobenzoquinone in a solvent selected from the group consisting of dioxane, benzene and acetone.

8. A method of preparing a 2-cyano-3-alkoxy-19-nor-pregna-1,3,5(10)-triene, comprising refluxing in dioxane a 2-cyano-3-alkoxy-19-nor-pregna-2,4-diene with a hydrogen acceptor selected from the group consisting of ethyl maleate, methyl maleate, ethyl fumarate, ethyl cinnamate and styrene, in the presence of Pd/C as a hydrogen transfer agent.

9. A method of preparing a 2-aminomethyl-19-nor-pregna-1,3,5(10)-triene having at the 3-position a group —OR₄ in which R₄ is H

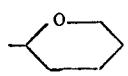

lower alkyl or benzyl, comprising reacting the corresponding 2-cyano compound with lithium aluminum hydride in a solvent selected from the group consisting of tetrahydrofurane, benzene and ethyl ether.

10. A method of preparing a 19-nor-pregna-1,3,5(10)-triene having at the 2-position a group —CH₂—NH—R_c wherein R_c is lower alkyl, aryl, aralkyl, cyclohexyl or cyclopentyl and at the 3-position a group —OR₄ wherein R₄ is H

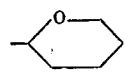

lower alkyl or benzyl, comprising reacting a corresponding compound having at the 2-position a group —CH=N—R_c wherein R_c has the meaning given above with a member selected from the group consisting of sodium borohydride and lithium aluminum hydride in a solvent selected from the group consisting of dioxane, methanol, water and mixtures thereof when said member is sodium borohydride and in a solvent selected from the group consisting of ethyl ether, benzene and tetrahydrofurane when said member is lithium aluminum hydride.

11. A method of preparing a 19-nor-pregna-1,3,5(10)-triene having at the 2-position a group —CH=N—R_c wherein R_c is lower alkyl, aryl, aralkyl, cyclohexyl or cyclopentyl and at the 3-position a group —OR₄ wherein R₄ is H

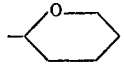

lower alkyl or benzyl, comprising reacting a corresponding 2-formyl compound with a compound of the formula H₂N=R_c wherein R_c has the meaning given above in a solvent selected from the group consisting of methanol, ethanol, benzene and toluene.

12. A method of preparing a 19-nor-pregna-1,3,5(10)-triene having at the 2-position a group —CH₂OH and at the 3-position a group —OR₄ wherein R₄ is H

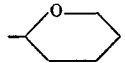

lower alkyl or benzyl, comprising reacting a corresponding compound having a group —CHO in the 2-position with a member selected from the group consisting of sodium borohydride and lithium aluminum hydride in a solvent selected from the group consisting of methanol, ethanol, dioxane, water and mixtures thereof when said member is sodium borohydride and in a solvent selected from the group consisting of tetrahydrofurane and ethyl ether when said member is lithium aluminum hydride.

13. A method of preparing a 19-nor-pregna-1,3,5(10)-triene having at the 2-position a group —COOH and at the 3-position a group —OR₄ wherein R₄ is H

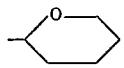

lower alkyl or benzyl, comprising reacting a corresponding compound having a group —CHO in the 2-position with an oxidizing agent selected from the group consisting of chromosulfuric mixture, pyridine and chromic anhydride, KMnO₄ and acetic acid, and ammoniacal silver nitrate.

14. A method of preparing a 19-nor-pregna-1,3,5(10)-triene having at the 2-position a group —COOR_d wherein R_d is lower alkyl, benzyl or phenyl and at the 3-position a group —OR₄ wherein R₄ is H

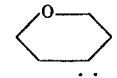

lower alkyl and benzyl, comprising reacting a corresponding compound having at the 2-position a group —COOR_e wherein R_e is H, Na or K with a member selected from the group consisting of thionyl chloride and oxalyl chloride in a solvent selected from the group consisting of benzene and ethyl ether and then reacting the resulting 2-carbonyl chloride with a dry hydroxy compound selected from the group consisting of a lower alkanol, benzyl alcohol and phenol.

15. A method of preparing a 19-nor-pregna-1,3,5(10)-triene having at the 2-position a group

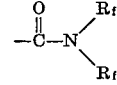

wherein R_f is H, lower alkyl, phenyl, C₆H₅NH—, —NH₂ or benzyl and at the 3-position a group OR₄ wherein R₄ is H

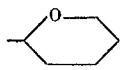

lower alkyl or benzyl, comprising reacting a corresponding compound having at the 2-position a group —COOR_e wherein R_e is H, Na or K with a member selected from the group consisting of thionyl chloride and oxalyl chloride in a solvent selected from the group consisting of benzene and ethyl ether and then reacting the resulting 2-carbonyl chloride with a member selected from the group consisting of ammonia, a lower alkyl amine, aniline, benzyl amine and phenyl hydrazine.

References Cited

UNITED STATES PATENTS

| | | | |
|---|---|---|---|
| 2,846,453 | 8/1958 | Hoehn | 260—397.4 |
| 3,062,843 | 11/1962 | Knox | 260—397.1 |
| 3,134,771 | 5/1964 | De Ruggieri et al. | 260—239.55 |
| 3,135,743 | 6/1964 | Clinton et al. | 260—239.55 |
| 3,160,643 | 12/1964 | Burn et al. | 260—397.4 |
| 3,265,686 | 8/1966 | Clinton et al. | 260—239.5 |
| 3,299,048 | 1/1967 | Nagata et al. | 260—239.55 |
| 3,305,545 | 2/1967 | De Ruggieri et al. | 260—2.5 |

FOREIGN PATENTS 926,040  5/1963  Great Britain.

OTHER REFERENCES

Djerassi: Steroid Reactions, Holden Day, 1963, pp. 135 and 229.

ELBERT L. ROBERTS, Primary Examiner

ETHEL G. LOVE, Assistant Examiner

U.S. Cl. X.R.

260—397.1, 397.4, 397.45, 397.47, 999